(12) United States Patent
Ichien et al.

(10) Patent No.: US 11,347,241 B2
(45) Date of Patent: May 31, 2022

(54) CONTROL DEVICE, CONTROL METHOD, AND NON-TRANSITORY PROGRAM RECORDING MEDIUM

(71) Applicant: NEC Corporation, Tokyo (JP)

(72) Inventors: Masumi Ichien, Tokyo (JP);
Masatsugu Ogawa, Tokyo (JP);
Masafumi Emura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 269 days.

(21) Appl. No.: 16/483,480

(22) PCT Filed: Feb. 21, 2017

(86) PCT No.: PCT/JP2017/006406
§ 371 (c)(1),
(2) Date: Aug. 5, 2019

(87) PCT Pub. No.: WO2018/154633
PCT Pub. Date: Aug. 30, 2018

(65) Prior Publication Data
US 2020/0019186 A1    Jan. 16, 2020

(51) Int. Cl.
*G05D 1/10*   (2006.01)
*H04W 4/46*   (2018.01)
(Continued)

(52) U.S. Cl.
CPC ............ *G05D 1/10* (2013.01); *G05D 1/0088* (2013.01); *G05D 1/0287* (2013.01); *H04W 4/46* (2018.02)

(58) Field of Classification Search
CPC ...... G05D 1/10; G05D 1/0088; G05D 1/0287; G05D 1/104; H04W 4/46; H04W 4/029; H04W 4/023
(Continued)

(56) References Cited

U.S. PATENT DOCUMENTS 8,712,624 B1 * 4/2014 Ferguson ............ G05D 1/0088
701/25
9,280,156 B1 * 3/2016 Ferguson ............ G05D 1/0212
(Continued)

FOREIGN PATENT DOCUMENTS

JP    H05-257533 A    10/1993
JP    2003-162326 A    6/2003
(Continued)

OTHER PUBLICATIONS

International Search Report for PCT Application No. PCT/JP2017/006406, dated May 16, 2017.
(Continued)

*Primary Examiner* — Paula L Schneider

(57) ABSTRACT

A control device includes a search information calculation unit, an area information storage unit, an area information update unit, and a location control unit. The search information calculation unit acquires information relating to a plurality of unmanned vehicles that move within a target area in accordance with a set operation, and calculates search information relating to the unmanned vehicles using the acquired information relating to the unmanned vehicles. The area information storage unit stores area information including indicators for searching the target area. The area information update unit updates the area information on the basis of said search information and the time that has elapsed since the last search conducted by the unmanned vehicles. The location control unit which, on the basis of the area information, calculates locations to which the unmanned vehicles should move, and outputs control signals for causing the unmanned vehicles to move to the calculated locations.

10 Claims, 9 Drawing Sheets

(51) Int. Cl.
*G05D 1/00* (2006.01)
*G05D 1/02* (2020.01)

(58) Field of Classification Search
USPC .......................................................... 701/23
See application file for complete search history.

(56) References Cited

U.S. PATENT DOCUMENTS

| | | | |
|---|---|---|---|
| 2006/0085106 A1* | 4/2006 | Gaudiano | G05D 1/104 |
| | | | 701/23 |
| 2009/0182464 A1 | 7/2009 | Myeong et al. | |
| 2013/0184864 A1 | 7/2013 | Guo et al. | |

FOREIGN PATENT DOCUMENTS

| | | |
|---|---|---|
| JP | 2006-350601 A | 12/2006 |
| JP | 2009-165823 A | 7/2009 |
| JP | 2009-205644 A | 9/2009 |
| JP | 2013-045265 A | 3/2013 |
| JP | 2015-505410 A | 2/2015 |

OTHER PUBLICATIONS

English translation of Written opinion for PCT Application No. PCT/JP2017/006406.

* cited by examiner

CONTROL DEVICE, CONTROL METHOD, AND NON-TRANSITORY PROGRAM RECORDING MEDIUM

This application is a National Stage Entry of PCT/JP2017/006406 filed on Feb. 21, 2017, the contents of all of which are incorporated herein by reference, in their entirety.

TECHNICAL FIELD

The present invention relates to a control system, a control method, and a program recording medium that control an unmanned vehicles.

BACKGROUND ART

There is a trend that arrangement control is performed on a plurality of unmanned vehicles equipped with an information acquisition apparatus such as a sensor and a camera, and the plurality of unmanned vehicles are used to perform an efficient and safe operation within a specific area. For example, it is considered that an unmanned vehicle that can fly is equipped with a camera, and is applied to a field of searching and monitoring an area that is difficult for a person to enter, such as a disaster area, in a wide range.

PTL 1 discloses a floor surface sweeping method of generating a plan for sweeping a floor surface of a predetermined operation region thoroughly while avoiding an obstacle by using positional information about a moving robot and obstacle information. The method in PTL 1 extremely reduces an area in which the moving robot working on the floor surface cannot work due to avoidance of an obstacle, and also eliminates an unworked region and a repeatedly worked region, thereby improving work efficiency.

PTL 2 discloses a path planning method of dividing a region in which a robot performs cleaning into a plurality of sub-regions, and planning a path in which cleaning is performed on a sub-region basis.

PTL 3 discloses a robot that autonomously moves by a movement means along a predetermined movement path, and collects security information. The robot in PTL 3 randomly generates a predetermined number of stop positions at which the robot stops on the movement path in addition to a significant monitoring position being a position at which the robot always stops on the movement path. When the robot in PTL 3 reaches the significant monitoring position or the stop position being randomly generated, the robot stops at the position for a predetermined period of time and collects security information.

PTL 4 discloses a method of exploration and monitoring of an environment for using a plurality of robots. In the method in PTL 4, each of the robots can navigate within an environment while maintaining a substantially minimum distance from another robot by calculating a navigation buffer area for each of the robots.

PTL 5 discloses a group robot system capable of extending a search range with a base station in a stop state. The system in PTL 5 has the base station as an uppermost layer, and forms a communication system having a hierarchical structure in which a plurality of sensing robot groups constitute a plurality of layers.

Herein, in a search operation when a search target such as an unknown person, a suspicious person, or an object moves, searching and monitoring of an area in which the search target is present are required to continue. When the search target changes a position with a lapse of time, even an area that is already searched once needs to be searched again. When a search operation of a moving search target is performed by a plurality of unmanned vehicles, it is desired that the unmanned vehicles exchange information in cooperation with one another, and thus a search position of the unmanned vehicle is efficiently controlled.

CITATION LIST

Patent Literature

[PTL 1] Japanese Unexamined Patent Application Publication No. H05-257533
[PTL 2] Japanese Unexamined Patent Application Publication No. 2009-165823
[PTL 3] Japanese Unexamined Patent Application Publication No. 2006-350601
[PTL 4] Japanese Unexamined Patent Application Publication No. 2015-505410
[PTL 5] Japanese Unexamined Patent Application Publication No. 2003-162326

SUMMARY OF INVENTION

Technical Problem

The techniques in PTLs 1 to 3 generate a plan for one behavior, and control a robot, based on the generated plan. However, the techniques in PTLs 1 to 3 cannot control the robot according to a fluctuation in a situation, and thus cannot achieve continuous search behavior. Further, the techniques in PTLs 1 to 3 are assumed to control one robot, and thus cannot be applied to cooperated search behavior by a plurality of unmanned vehicles. In other words, the techniques in PTLs 1 to 3 have a problem that a continuous search operation in which a plurality of unmanned vehicles cooperate cannot be achieved. The reason is that an unmanned vehicle cannot be controlled in consideration of another unmanned vehicle and a situation change due to a lapse of time in a target area.

An object of the present invention is to solve the above-mentioned problem and to provide a control device that achieves an efficient and continuous search operation by a plurality of unmanned vehicles while accommodating an environmental fluctuation in a target area.

Solution to Problem

A control device according to one aspect of the present invention includes a search information calculation unit which acquires information related to a plurality of unmanned vehicles moving within a target area according to a set operation, and calculating search information about the unmanned vehicle by using the acquired information related to the unmanned vehicle, an area information holding unit which holds area information including an index for searching in the target area, an area information update unit which updates the area information, based on an elapsed time since a search is performed by the unmanned vehicle and the search information, and a position control unit which calculates a position of a movement destination of the unmanned vehicle, based on the area information, and outputting a control signal for moving the unmanned vehicle to the calculated position.

A control method according to one aspect of the present invention includes acquiring information related to a plurality of unmanned vehicles moving within a target area according to a set operation, calculating search information about the unmanned vehicle by using the acquired information related to the unmanned vehicle, updating area information including an index for searching in the target area, based on an elapsed time since a search is performed by the unmanned vehicle and the search information, calculating a position of a movement destination of the unmanned vehicle, based on the area information, and outputting a control signal for moving the unmanned vehicle to the calculated position.

A program recording medium according to one aspect of the present invention records a program causing a computer to execute processing of acquiring information related to a plurality of unmanned vehicles moving within a target area according to a set operation, processing of calculating search information about the unmanned vehicle by using the acquired information related to the unmanned vehicle, processing of updating area information including an index for searching in the target area, based on an elapsed time since a search is performed by the unmanned vehicle and the search information, processing of calculating a position of a movement destination of the unmanned vehicle, based on the area information, and processing of outputting a control signal for moving the unmanned vehicle to the calculated position.

Advantageous Effects of Invention

The present invention is able to provide a control device that achieves an efficient and continuous search operation by a plurality of unmanned vehicles while accommodating an environmental fluctuation in a target area.

BRIEF DESCRIPTION OF DRAWINGS

FIG. 11 is a block diagram illustrating one example of a hardware configuration that achieves a control system of the control device according to each of the example embodiments of the present invention.

EXAMPLE EMBODIMENT

Hereinafter, example embodiments of the present invention are described by using drawings. However, limitation technically preferable for the present invention is imposed on the example embodiments described below, but the example embodiments do not limit the scope of the invention to the following description. Note that, similar places are provided with the same reference signs in all the drawings used for the description of the example embodiments below unless there is a particular reason. Further, repetitive description of a similar configuration and operation may be omitted from the example embodiments below.

First Example Embodiment (Configuration)

First, an unmanned vehicles control system according to a first example embodiment of the present invention is described with reference to drawings. The unmanned vehicles control system in the present example embodiment is disposed in an area to be a target (hereinafter, a target area) on which a set operation is performed, and performs arrangement control of a plurality of unmanned vehicles that perform the set operation. In the following description, controlling arrangement of the plurality of unmanned vehicles is described, and description of a specific operation performed by the unmanned vehicle is omitted. Examples of the operation performed by the unmanned vehicle include a search operation of searching for a search target, a tracking operation of tracking a tracking target, and the like.

Figure 1:
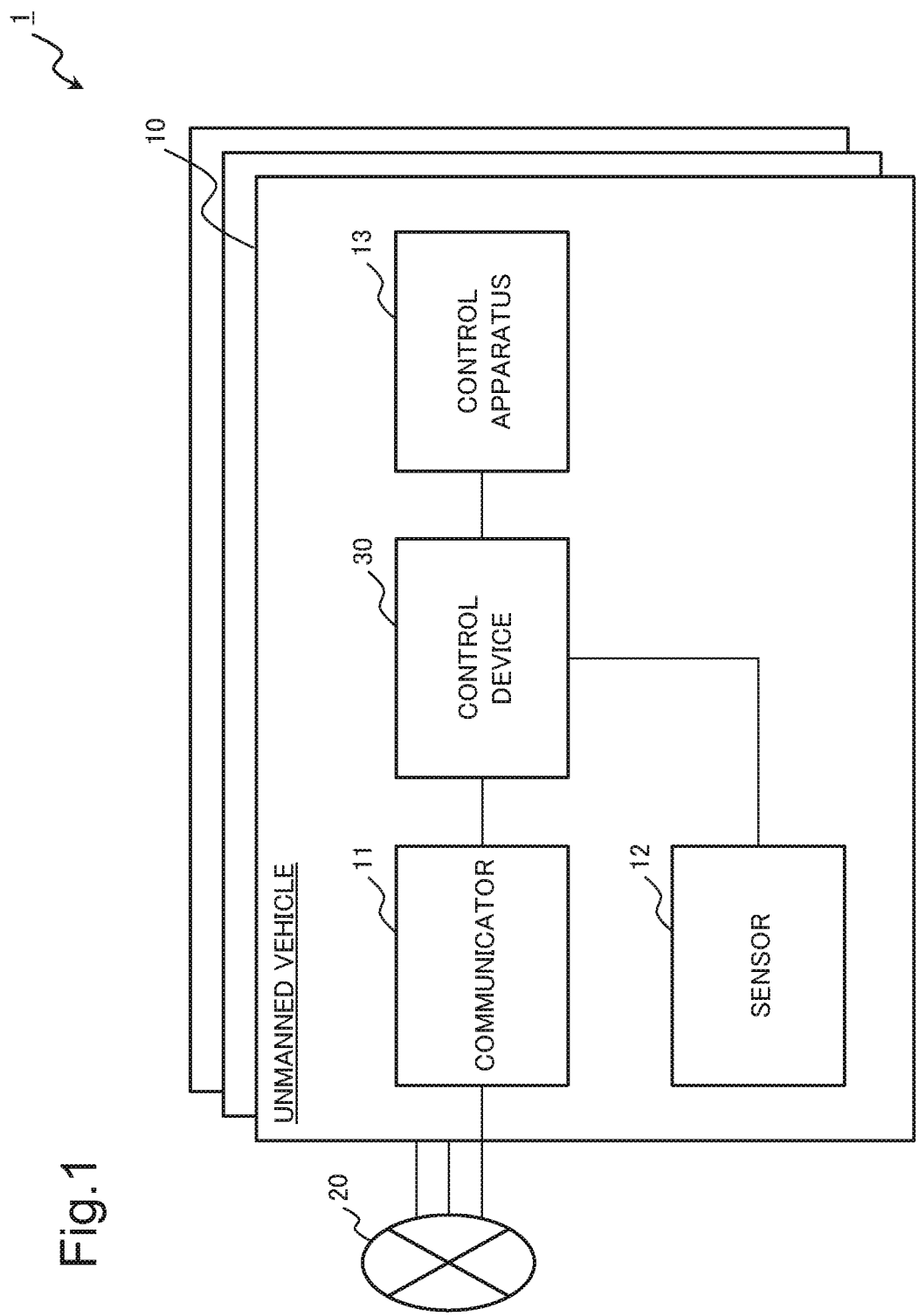
FIG. 1 is a block diagram illustrating a configuration of an unmanned vehicles control system according to a first example embodiment of the present invention.

FIG. 1 is a block diagram illustrating a configuration of an unmanned vehicles control system 1 according to the present example embodiment. In the present example embodiment, an example in which a plurality of unmanned vehicles 10 communicate with each other via a communication network 20 is described. As illustrated in FIG. 1, each of the unmanned vehicles 10 in the present example embodiment includes a communicator 11, a sensor 12, a control apparatus 13, and a control device 30.

The communicator 11 (also referred to as an unmanned vehicle-side communicator) of one unmanned vehicle communicates with another unmanned vehicle (hereinafter referred to as another vehicle) via the communication network 20. The communicator 11 of the one unmanned vehicle 10 receives information (hereinafter referred to as another-vehicle information) related to another (the other) vehicle transmitted from the other vehicle. Further, the communicator 11 of the one unmanned vehicle 10 transmits information (hereinafter referred to as own-vehicle information) related to the one unmanned vehicle 10 (hereinafter referred to as one vehicle) to the other vehicle. The communicator 11 outputs the another-vehicle information received from the other vehicle to the control device 30, and transmits the own-vehicle information received from the control device 30 to the other vehicle. For example, the communicator 11 transmits and receives detection information that the unmanned vehicle 10 acquires by using the sensor 12, positional information about the unmanned vehicle 10, area information held by the unmanned vehicle 10, and the like. However, information transmitted and received by the unmanned vehicle 10 is not limited to the examples herein.

A limitation is not particularly imposed on a method of acquiring another-vehicle information by the communicator 11. For example, the communicator 11 may not only perform communication via the communication network 20, but may also communicate with another vehicle within a communicable range, and may acquire another-vehicle information about another vehicle located outside the communicable range via different another vehicle within a communication range by multi-hop.

The sensor 12 is an apparatus for detecting, in a target area, information (hereinafter, detection information) related to a detection range of the sensor 12. For example, the sensor 12 acquires detection information within the detection range by a camera, an acoustic sensor, and the Global Positioning System (GPS). The sensor 12 acquires detection information related to an image, sound, positional information, and the like detected in the detection range. The sensor 12 outputs the acquired detection information to the control device 30.

The control apparatus 13 performs drive control of a power system that operates a device for changing a position of one vehicle. For example, the control apparatus 13 performs drive control of a power system that operates a propeller in a case of a flying system and a wheel in a case of a ground system.

The communication network 20 is a communication path used in communication between the unmanned vehicles 10. The communication network 20 may be included in the configuration of the present example embodiment in a case where the communication network 20 is a dedicated line, and may not be included in the configuration of the present example embodiment in a case where the communication network 20 is a public line such as the Internet.

When the plurality of unmanned vehicles 10 perform a task of a search and the like according to a set operation, the control device 30 calculates search information about one vehicle and another vehicle by using own-vehicle information and another-vehicle information. The search information is positional information of the unmanned vehicle 10 and information about a detection range of the unmanned vehicle 10, time at which a search is performed, and the like.

The control device 30 updates area information including an index related to a search in a target area, based on the calculated search information about one vehicle and another vehicle and an elapsed time since the search information is updated. The area information is an index related to a search in a target area. For example, the area information includes an index such as a degree of importance, uncertainty, and the like. The control device 30 controls a position of one vehicle by using held area information.

The description above is description related to an outline of the configuration of the unmanned vehicles control system 1.

[Control Device]

Figure 2:
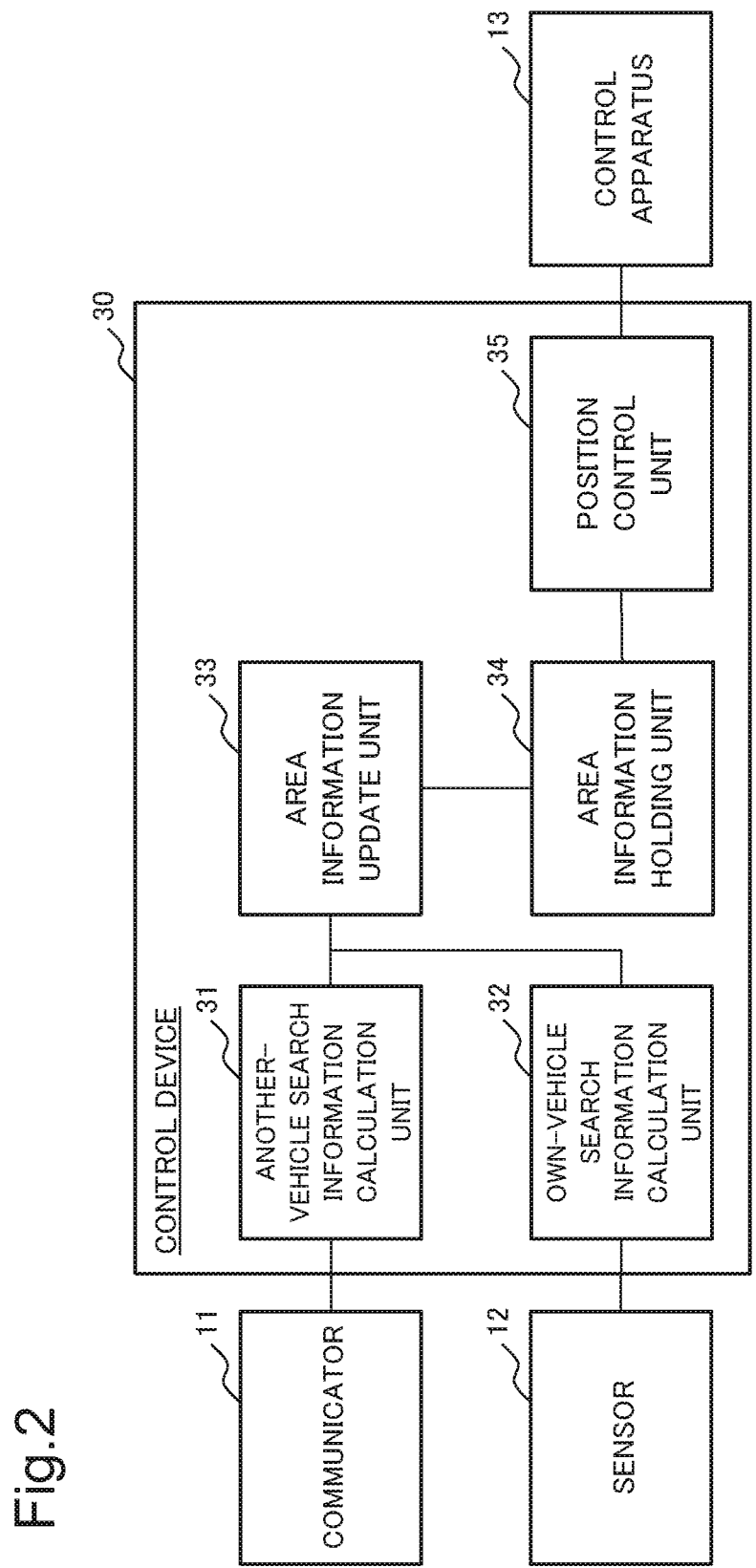
FIG. 2 is a block diagram illustrating a configuration of a control device of the unmanned vehicles control system according to the first example embodiment of the present invention.

Next, a detailed configuration of the control device 30 is described with reference to a drawing. FIG. 2 is a block diagram illustrating the configuration of the control device 30. As illustrated in FIG. 2, the control device 30 includes an another-vehicle search information calculation unit 31, an own-vehicle search information calculation unit 32, an area information update unit 33, an area information holding unit 34, and a position control unit 35.

The another-vehicle search information calculation unit 31 (also referred to as a search information calculation unit) acquires information (hereinafter, another-vehicle information) about another vehicle from the communicator 11. The another-vehicle search information calculation unit 31 calculates a search situation of another vehicle (hereinafter, another-vehicle search information) by using the acquired another-vehicle information. The another-vehicle search information calculation unit 31 outputs the calculated another-vehicle search information to the area information update unit 33.

For example, the another-vehicle search information calculation unit 31 acquires area information held by another vehicle without any change, and sets detection information extracted from the area information as search information about the other vehicle. Further, for example, the another-vehicle search information calculation unit 31 acquires information about a current position of another vehicle, and calculates, as a detection range of the other vehicle, an area within a circle having a predetermined radius with the current position of the other vehicle as the center.

The own-vehicle search information calculation unit 32 acquires detection information about an own vehicle from the sensor 12 of the own vehicle. The own-vehicle search information calculation unit 32 calculates a search situation of the own vehicle (hereinafter, own-vehicle search information) by using the acquired detection information. The own-vehicle search information calculation unit 32 outputs the calculated own-vehicle search information to the area information update unit 33.

For example, the own-vehicle search information calculation unit 32 acquires an image captured by a camera as detection information, calculates a direction and a range being searched from the image, and sets an area being a target as a searched area. Further, for example, the own-vehicle search information calculation unit 32 calculates a range detected by another vehicle by using a radar, and sets the range as a searched range.

The area information update unit 33 acquires another-vehicle search information from the another-vehicle search information calculation unit 31, and also acquires own-vehicle search information from the own-vehicle search information calculation unit 32. The area information update unit 33 takes the latest another-vehicle search information, the latest own-vehicle search information, and an elapsed time from a previous search into account, and updates area information stored in the area information holding unit 34.

The area information holding unit 34 holds area information. The area information held by the area information holding unit 34 is updated by the area information holding unit 33.

The position control unit 35 acquires the area information from the area information holding unit 34. The position control unit 35 calculates a position in which one vehicle needs to be disposed by using the acquired area information. The position control unit 35 transmits a control signal for moving the one vehicle to the calculated position to the control apparatus 13.

For example, the position control unit 35 determines a responsible range of one vehicle by using positional information about adjacent another vehicle, based on a Voronoi diagram. The position control unit 35 calculates, as an optimum position, a position that maximizes an evaluation value calculated from an index value (a degree of area importance) within the responsible range and a distance between an area and the one vehicle. For example, a target area is divided into a plurality of subareas, a degree of importance is assigned to each subarea, and sum of values acquired by multiplying a degree of importance of each area within a responsible range of one vehicle by a distance between each area and the one vehicle is set as an evaluation value. The evaluation value is a value according to the degree of importance of the area and corresponding to an existence value of a current position of the one vehicle within the responsible range. Each unmanned vehicle calculates a position of one vehicle in which an evaluation value is maximum as an optimum position at any time, and moves to the optimum position. Thus, optimum arrangement control of an unmanned vehicles constituted by the plurality of unmanned vehicles 10 is achieved. Note that an evaluation value used when the position control unit 35 calculates an optimum position is not limited to the example herein.

Further, for example, the position control unit 35 divides a target area into a plurality of subareas, and performs control in such a way that an unmanned vehicle moves to a position having the greatest search efficiency according to an index of area information, that is, a subarea in which an assigned index value is maximum or minimum. Further, for example, the position control unit 35 outputs a control signal for moving the unmanned vehicle 10 to the subarea in which the index value is maximum among subareas adjacent to a subarea in which the unmanned vehicle 10 is located.

The description above is description related to details of the configuration of the control device 30 in the present example embodiment.

(Operation)

Next, an operation of the control device 30 in the present example embodiment is described with reference to a drawing. Hereinafter, in a passage in which each component of the control device 30 is described as a subject, the control device 30 may also be regarded as a subject.

[Area Information Update Processing]

Figure 3:
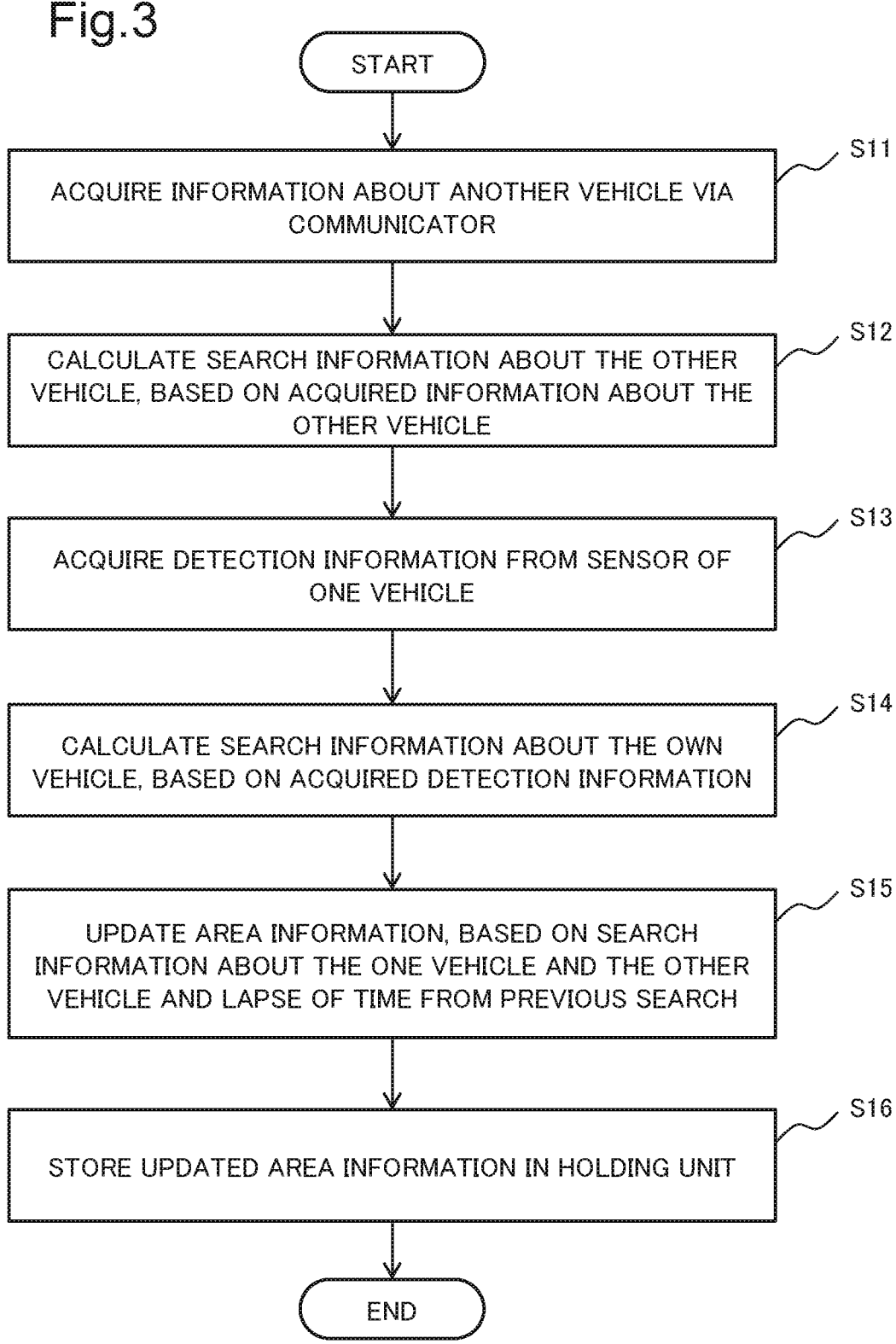
FIG. 3 is a flowchart for describing processing of updating area information of one vehicle by the control device according to the first example embodiment of the present invention.

First, with reference to FIG. 3, processing (hereinafter referred to as area information update processing) of updating area information of one vehicle by the control device 30 is described. FIG. 3 is a flowchart for describing the area information update processing. Note that it is assumed that the area information update processing in FIG. 3 is repeatedly performed at predetermined timing.

In FIG. 3, first, the another-vehicle search information calculation unit 31 acquires another-vehicle information via the communicator 11 (Step S11).

Next, the another-vehicle search information calculation unit 31 calculates another-vehicle search information by using the acquired another-vehicle information (Step S12).

Next, the own-vehicle search information calculation unit 32 acquires detection information from the sensor 12 of one vehicle (Step S13).

Next, the own-vehicle search information calculation unit 32 calculates own-vehicle search information by using the acquired detection information about the one vehicle (Step S14).

Next, the area information update unit 33 takes the own-vehicle search information, the another-vehicle search information, and a lapse of time since previous search information is updated into account, and updates area information of the one vehicle (Step S15).

Then, the area information update unit 33 stores the updated area information in the area information holding unit 34 (Step S16).

Figure 4:
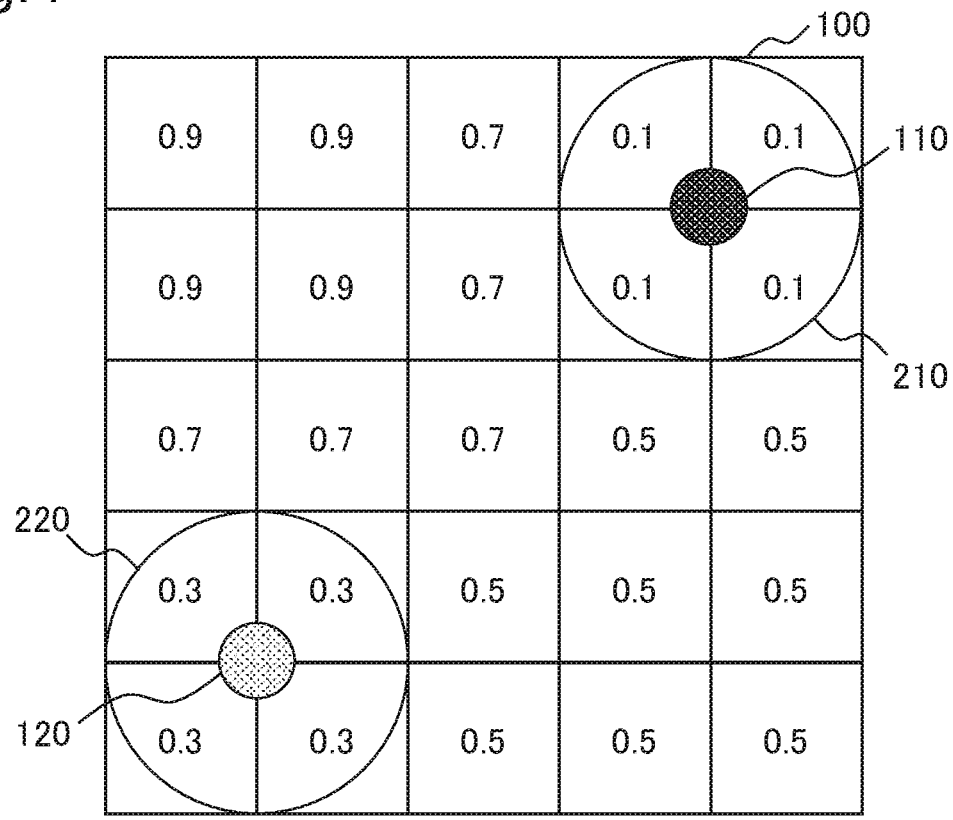
FIG. 4 is a schematic diagram illustrating one example of updating area information of the control device according to the first example embodiment of the present invention.

Herein, description related to the area information update processing is given by taking one example. FIG. 4 is an example in which a target area 100 is divided in a grid pattern, and area information having an index value being assigned to each divided subarea is managed. Note that a target area may be divided into any shape instead of a grid pattern.

In FIG. 4, positions of one vehicle 110 and another vehicle 120, a detection range 210 of the one vehicle 110, and a detection range 220 of the other vehicle 120 are indicated by circles. In the example in FIG. 4, an index value of a search in each subarea is indicated by a numerical value referred to as a degree of importance. A degree of importance having a greater numerical value indicates greater necessity for a search.

Area information has been just updated by using detection information acquired by the one vehicle 110 for a range within the detection range 210 of the one vehicle 110, and necessity for a search at the present time is small, and thus a degree of importance is small. In the example in FIG. 4, the degree of importance of the detection range 210 of the one vehicle 110 is set to 0.1.

Further, a range within the detection range 220 calculated concerning the other vehicle 120 has been just detected by the other vehicle 120, and necessity for a search is low, and thus a degree of importance is small. In the example in FIG. 4, the degree of importance of the detection range 220 of the other vehicle 120 is set to 0.3.

Then, a degree of importance of a subarea located outside a sensing range of the one vehicle 110 and the other vehicle 120 is increased according to an elapsed time since the subarea is searched. For example, the degree of importance may be linearly increased according to the elapsed time. Further, for example, an increment in degree of importance may be increased by a function that monotonously increases with a time change.

The description above is description of the area information update processing by the control device 30.

[Information Transmission Processing]

Figure 5:
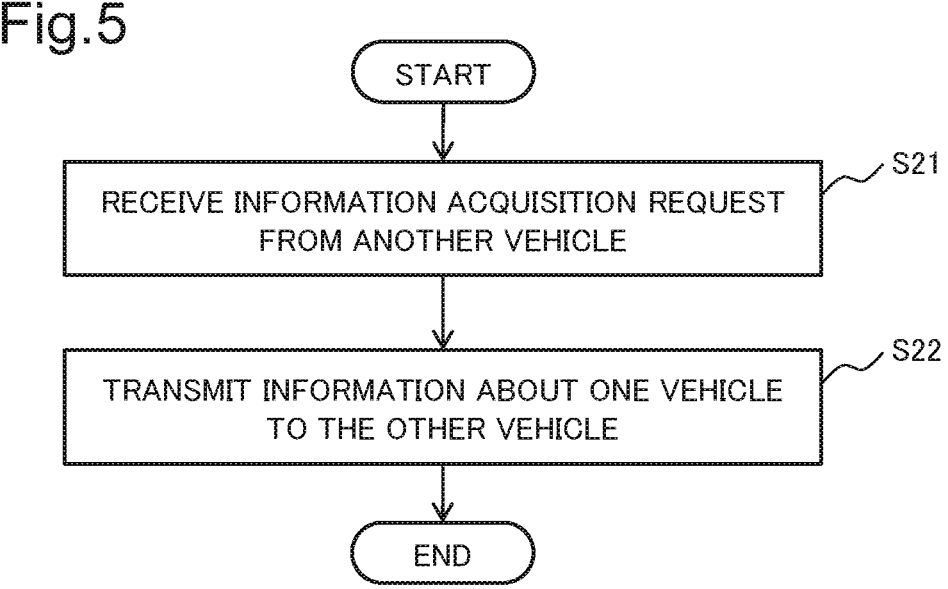
FIG. 5 is a flowchart for describing processing of transmitting information to another vehicle according to an information acquisition request from the other vehicle by the control device according to the first example embodiment of the present invention.

Next, with reference to FIG. 5, processing (hereinafter referred to as information transmission processing) of transmitting, in response to an information acquisition request from another vehicle, information to the other vehicle that has transmitted the information acquisition request is described. FIG. 5 is a flowchart for describing the information transmission processing.

In FIG. 5, first, the control device 30 receives an information acquisition request from another vehicle via the communicator 11 (Step S21).

Then, the control device 30 transmits, via the communicator 11, information about one vehicle to the other vehicle that has transmitted the information acquisition request (Step S22).

The description above is description of the information transmission processing by the control device 30.

[Position Control Processing]

Figure 6:
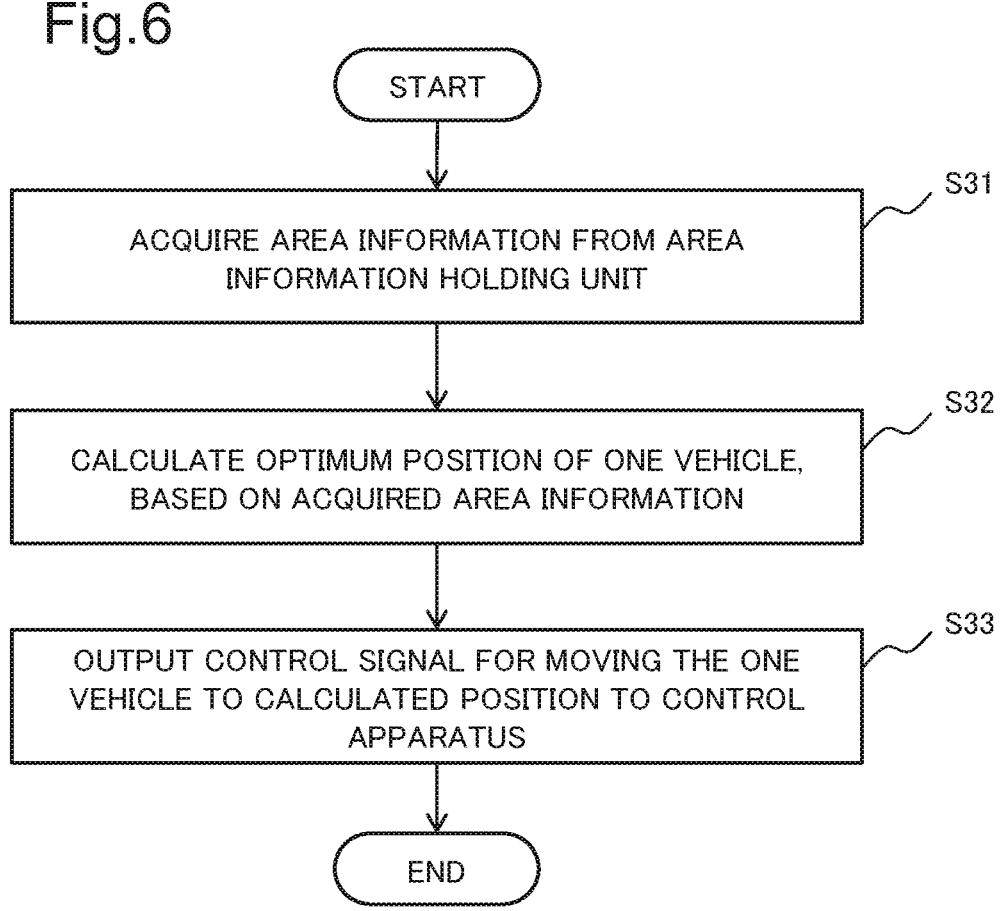
FIG. 6 is a flowchart for describing processing of controlling a position of the one vehicle by the control device according to the first example embodiment of the present invention.

Next, with reference to FIG. 6, processing (hereinafter referred to as position control processing) of controlling a position of one vehicle is described. FIG. 6 is a flowchart for describing the position control processing. Note that it is assumed that the position control processing below is repeatedly and regularly performed.

In FIG. 6, first, the position control unit 35 acquires area information from the area information holding unit 34 (Step S31).

Next, the position control unit 35 calculates an optimum position as a movement destination of one vehicle, based on the acquired area information (Step S32).

Then, the position control unit 35 outputs a control signal for moving the one vehicle to the calculated position to the control apparatus 13 (Step S33).

The description above is description of the position control processing by the control device 30.

As described above, in the present example embodiment, area information being an index of a search in a target area is held by each unmanned vehicle, information about one vehicle and another vehicle and an elapsed time since search information is updated are taken into account, and the area information is updated. Then, in the present example embodiment, position control is regularly performed on each unmanned vehicle, based on the updated area information. Thus, according to the present example embodiment, an efficient and continuous search operation by a plurality of unmanned vehicles can be achieved while accommodating environmental fluctuations in a target area.

Second Example Embodiment

Next, an unmanned vehicles control system according to a second example embodiment of the present invention is described with reference to drawings. In the present example embodiment, a management device that calculates arrangement control of each unmanned vehicle, and performs centralized control on a plurality of unmanned vehicles is installed.

(Configuration)

Figure 7:
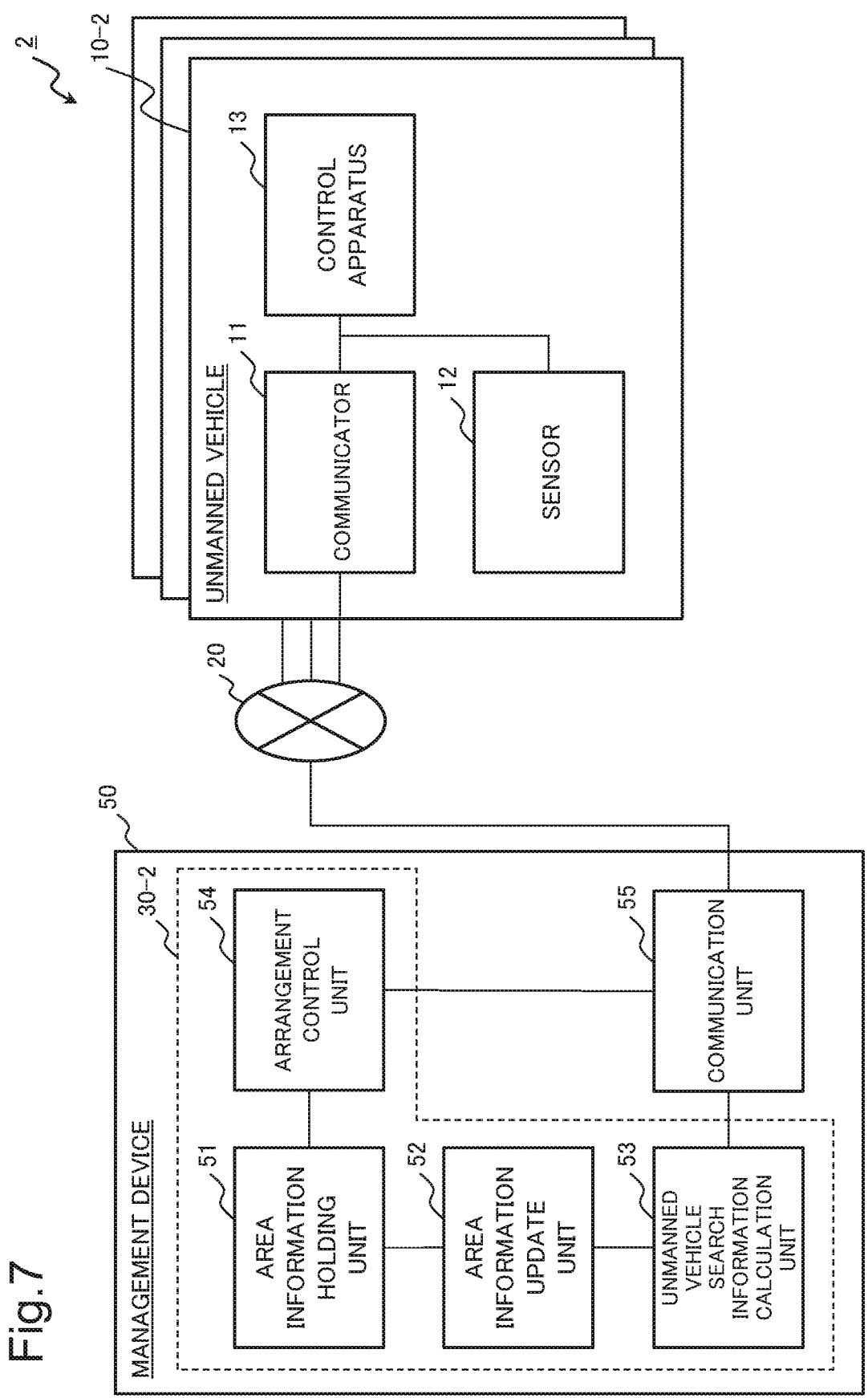
FIG. 7 is a block diagram illustrating a configuration of an unmanned vehicles control system according to a second example embodiment of the present invention.

FIG. 7 is a block diagram illustrating a configuration of an unmanned vehicles control system 2 in the present example embodiment. As illustrated in FIG. 7, a management device 50 is communicably connected to a plurality of unmanned vehicles 10-2 via a communication network 20. Note that the number of unmanned vehicles 10-2 is not particularly limited.

The unmanned vehicle 10-2 is communicably connected to the management device 50 via the communication network 20. The unmanned vehicle 10-2 includes a communicator 11, a sensor 12, and a control apparatus 13. In other words, the unmanned vehicle 10-2 has a configuration in which the control device 30 is omitted from the unmanned vehicle 10 in the first example embodiment. Note that the communicator 11, the sensor 12, and the control apparatus 13 are similar to the configurations included in the unmanned vehicle 10 in the first example embodiment, and thus detailed description is omitted.

The unmanned vehicle 10-2 acquires detection information within a detection range by the sensor 12, and transmits the acquired detection information to the management device 50. Further, the unmanned vehicle 10-2 performs reception of a control signal from the management device 50 and position control of one vehicle according to the received control signal.

The communication network 20 is a communication path used in communication between the management device 50 and the unmanned vehicle 10-2 and communication between the unmanned vehicles 10.

The management device 50 performs holding of area information about a target area, acquisition of information about each unmanned vehicle 10-2, arrangement control calculation for each unmanned vehicle 10-2, and transmission of a control signal to each unmanned vehicle 10-2.

The description above is description related to an outline of the configuration of the unmanned vehicles control system 2 according to the present example embodiment.

[Management Device]

Next, a detailed configuration of the management device 50 is described with reference to a drawing. The management device 50 includes a control device 30-2 and a communicator 55. The control device 30-2 includes an area information holding unit 51, an area information update unit 52, an unmanned vehicle search information calculation unit 53, and an arrangement control unit 54.

The area information holding unit 51 holds area information being an index related to a search in a target area. The area information holding unit 51 corresponds to the area information holding unit 34 of the control device 30 according to the first example embodiment.

The area information update unit 52 acquires search information about each unmanned vehicle 10-2 from the unmanned vehicle search information calculation unit 53, and acquires area information about a target area from the area information holding unit 51. The area information update unit 52 updates the area information stored in the area information holding unit 51, based on the search information about each unmanned vehicle 10-2 and an elapsed time since the search information is updated. The area information update unit 52 corresponds to the area information update unit 33 of the control device 30 according to the first example embodiment.

The unmanned vehicle search information calculation unit 53 acquires information about each unmanned vehicle 10-2 via the communicator 55. The unmanned vehicle search information calculation unit 53 calculates search information by using the acquired information about each unmanned vehicle 10-2. The unmanned vehicle search information calculation unit 53 outputs the calculated search information to the area information update unit 52. The unmanned vehicle search information calculation unit 53 corresponds to the another-vehicle search information calculation unit 31 of the control device 30 according to the first example embodiment.

The arrangement control unit 54 (also referred to as a position control unit) acquires area information from the area information holding unit 51. The arrangement control unit 54 selects optimum arrangement of an unmanned vehicles, based on the acquired area information. For example, the arrangement control unit 54 sets a plurality of arrangement patterns of the unmanned vehicles, and assigns an index value, such as a degree of area importance, to a subarea within a target area for each set pattern. Then, the arrangement control unit 54 calculates sum of the index values assigned to the subareas, and selects a pattern whose sum of the index value is minimum as optimum arrangement of the unmanned vehicles.

The arrangement control unit 54 transmits a control signal for changing a position of each unmanned vehicle 10-2 to each unmanned vehicle 10-2 via the communicator 55. The arrangement control unit 54 corresponds to the position control unit 35 of the control device 30 according to the first example embodiment.

The communicator 55 (also referred to as a management-side communicator) communicates with each unmanned vehicle 10-2 via the communication network 20. The communicator 55 receives information (also referred to as unmanned vehicle information) transmitted from each unmanned vehicle 10-2. The communicator 55 outputs the received unmanned vehicle information about each unmanned vehicle 10-2 to the unmanned vehicle search information calculation unit 53. Further, the communicator 55 transmits a control signal for changing a position of each unmanned vehicle 10-2 to each unmanned vehicle 10-2. The communicator 55 corresponds to the communicator 11 of the unmanned vehicle 10 according to the first example embodiment.

As described above, the control device 30-2 in the present example embodiment has a configuration in which the own-vehicle search information calculation unit 32 is eliminated from the control device 30 in the first example embodiment and the another-vehicle search information calculation unit 31 is replaced with the unmanned vehicle search information calculation unit 53.

The description above is description related to the configuration of the management device 50 in the present example embodiment.

(Operation)

Next, an operation of the management device 50 in the present example embodiment is described with reference to a drawing. Note that, when each component of the management device 50 is described below as a subject, the management device 50 may also be regarded as a subject.

[Area Information Update Processing]

Figure 8:
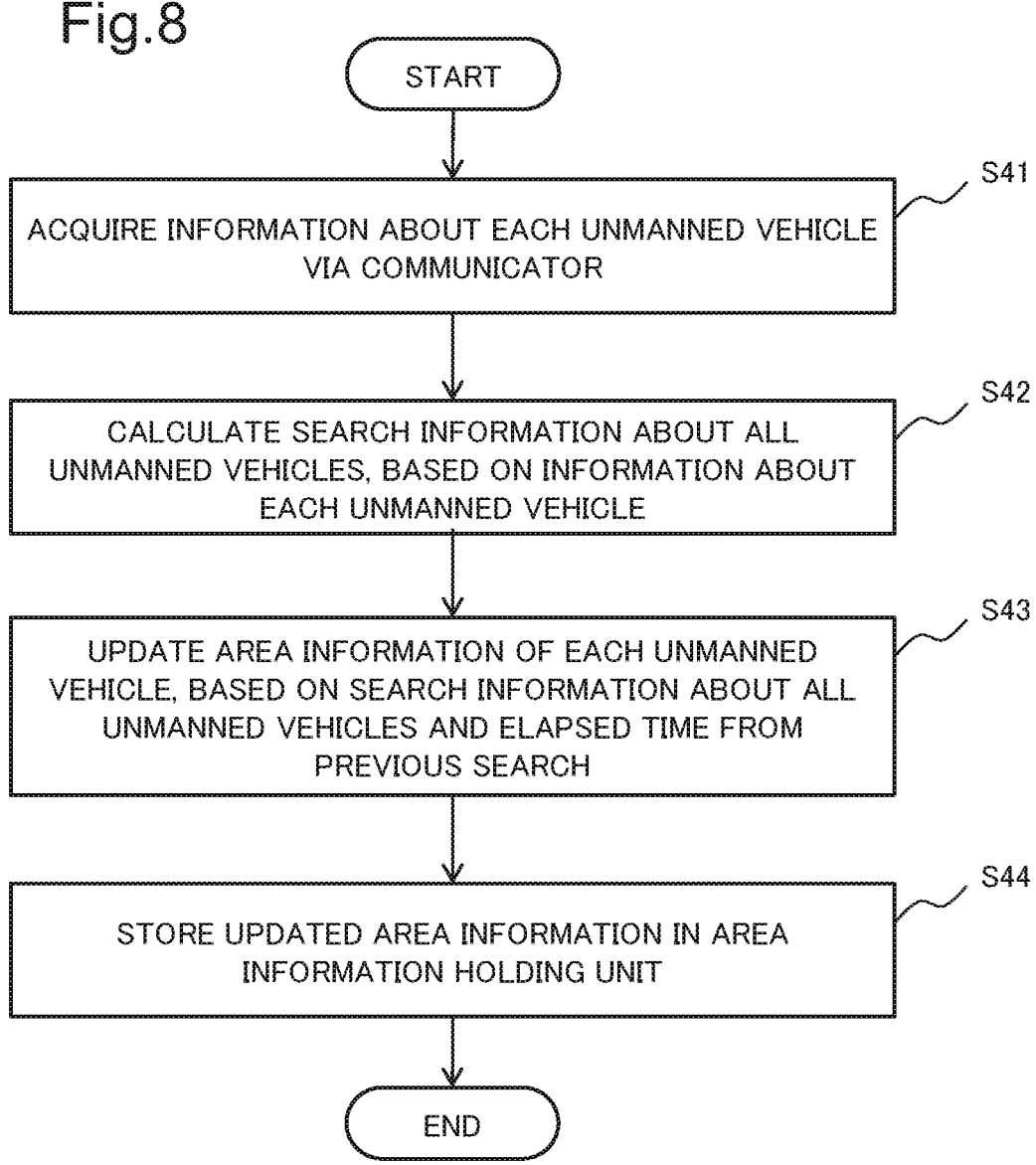
FIG. 8 is a flowchart for describing processing of updating area information by a management device according to the second example embodiment of the present invention.

First, with reference to FIG. 8, processing (hereinafter referred to as area information update processing) of updating area information by the management device 50 is described. FIG. 8 is a flowchart for describing the area information update processing. Note that it is assumed that the area information update processing in FIG. 8 is repeatedly performed at predetermined timing.

In FIG. 8, first, the unmanned vehicle search information calculation unit 53 acquires information about each unmanned vehicle 10-2 via the communicator 55 (Step S41).

Next, the unmanned vehicle search information calculation unit 53 calculates search information acquired by integrating information about all the unmanned vehicles 10-2 by using the information about each of the unmanned vehicles 10-2 (Step S42).

Next, the area information update unit 52 updates area information, based on the calculated search information and an elapsed time from a previous search (Step S43).

Then, the area information update unit 52 stores the updated area information in the area information holding unit 51 (Step S44).

The description above is description of the area information update processing by the management device 50.

[Arrangement Control Processing]

Figure 9:
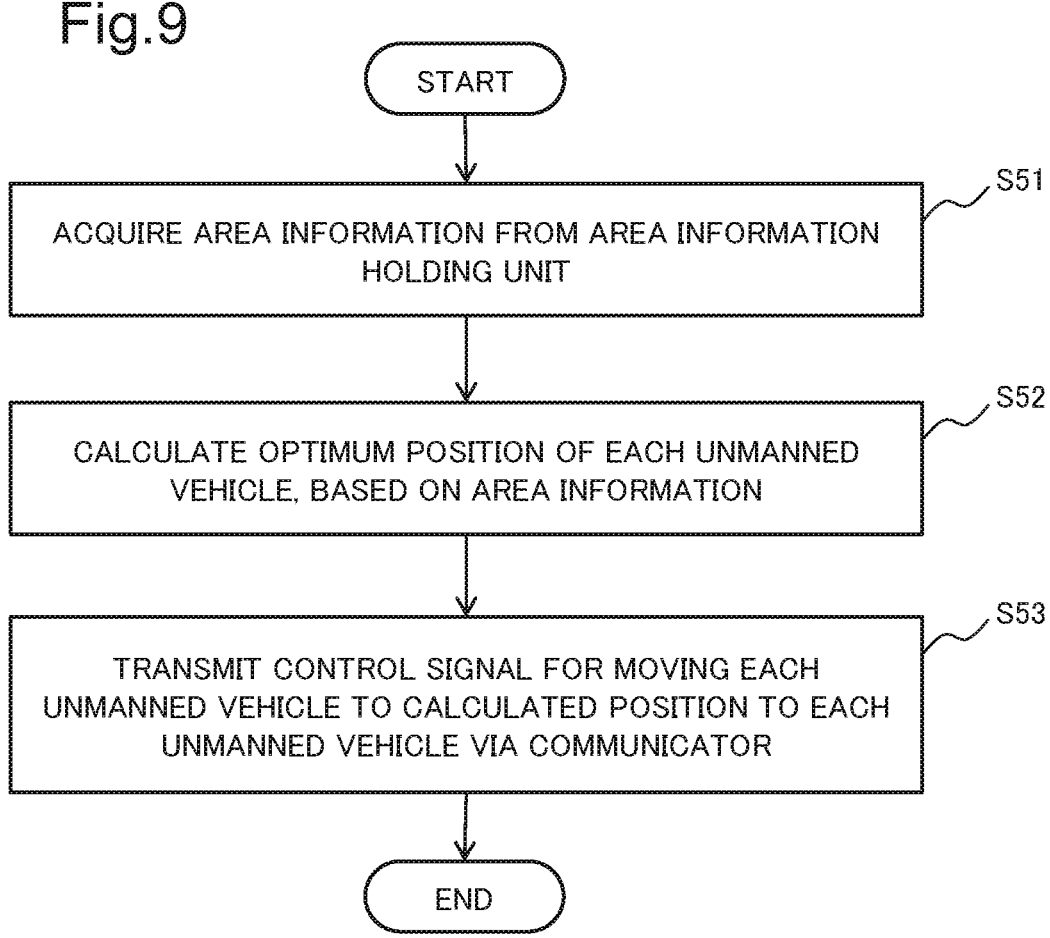
FIG. 9 is a flowchart for describing processing of controlling arrangement of each unmanned vehicle by the management device according to the second example embodiment of the present invention.

Next, with reference to FIG. 9, processing (hereinafter referred to as arrangement control processing) of controlling arrangement of the plurality of unmanned vehicles 10-2 is described. FIG. 9 is a flowchart for describing the arrangement control processing.

In FIG. 9, first, the arrangement control unit 54 acquires area information from the area information holding unit 51 (Step S51).

Next, the arrangement control unit 54 calculates an optimum arrangement of each unmanned vehicle 10-2, based on the acquired area information (Step S52).

Then, the communicator 55 transmits a control signal to each unmanned vehicle 10-2 in such a way that the unmanned vehicle 10-2 is disposed in the calculated position (Step S53).

The description above is description of the arrangement control processing by the management device 50.

As described above, in the present example embodiment, the management device that performs centralized control of arrangement of the plurality of unmanned vehicles is provided, and thus a control device may not be installed on an unmanned vehicle side. In other words, according to the present example embodiment, an effect similar to that in the first example embodiment can be acquired, and also the configuration of the unmanned vehicle can be simplified as compared with the first example embodiment.

Third Example Embodiment

Figure 10:
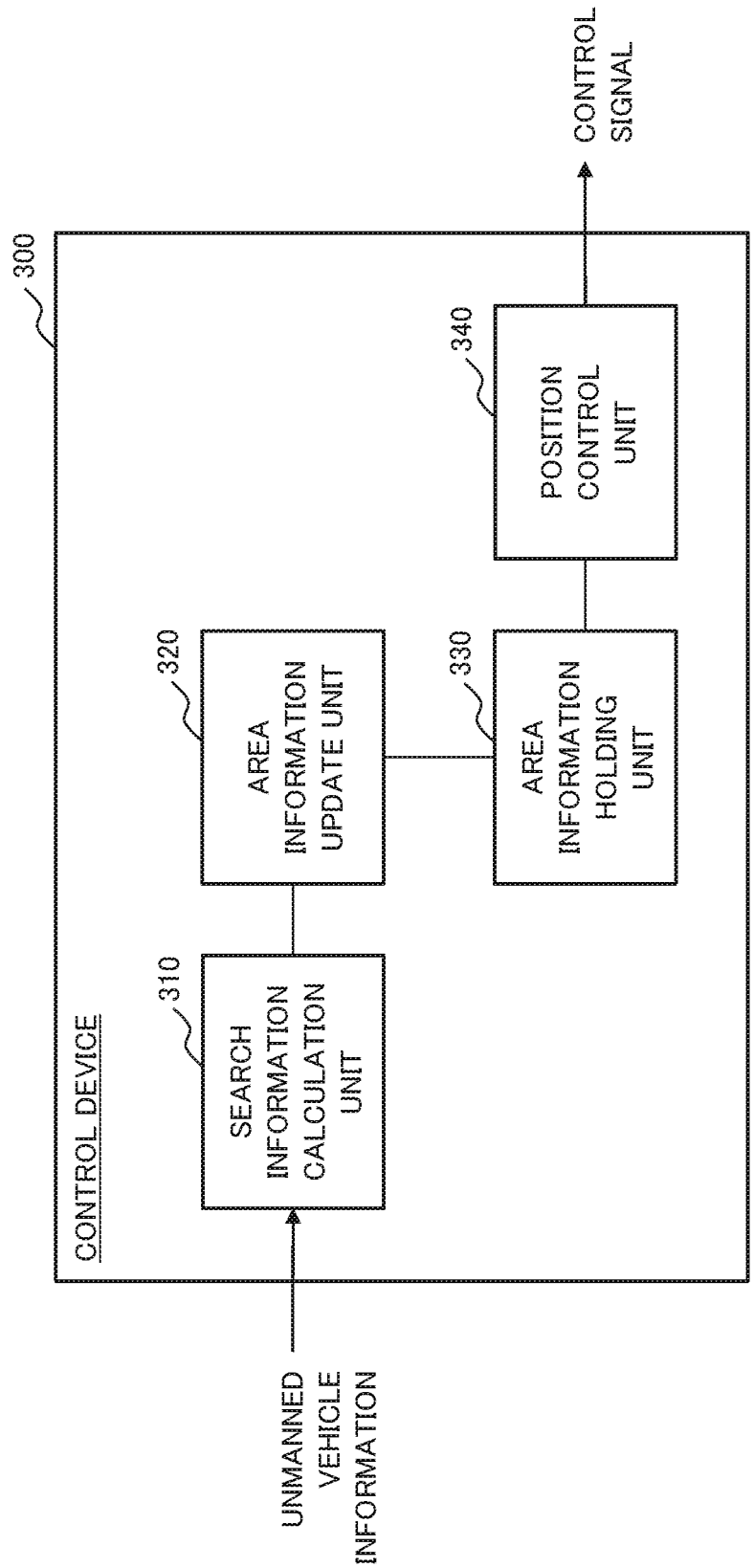
FIG. 10 is a block diagram illustrating a configuration of a control device according to a third example embodiment of the present invention.

Next, a control device according to a third example embodiment of the present invention is described with reference to a drawing. FIG. 10 is a block diagram illustrating a configuration of a control device 300 in the present example embodiment. The control device 300 in the present example embodiment has a configuration acquired by making the control device 30 in the first example embodiment and the control device 30-2 in the second example embodiment into a superordinate concept. Note that a flow of a signal illustrated in FIG. 10 is one example, and does not limit a direction in which a signal is transmitted.

As illustrated in FIG. 10, the control device 300 includes a search information calculation unit 310, an area information update unit 320, an area information holding unit 330 and a position control unit 340.

The search information calculation unit 310 acquires information (also referred to as unmanned vehicle information) related to a plurality of unmanned vehicles moving within a target area according to a set operation. The search information calculation unit 310 calculates search information about the unmanned vehicle by using the acquired information related to the unmanned vehicle.

The area information update unit 320 updates area information, based on an elapsed time since a search is performed by the unmanned vehicle and the search information. For example, when updating the area information, the area information update unit 320 reduces an index value within a detection range of the unmanned vehicle and increases an index value outside the detection range of the unmanned vehicle, based on the search information.

The area information holding unit 330 holds area information including an index relates to a search in a target area. For example, the area information holding unit 330 holds, as the area information, information in which an index value is assigned to a subarea formed by dividing the target area.

The position control unit 340 calculates a position of a movement destination of the unmanned vehicle, based on the area information. The position control unit 340 outputs a control signal for moving the unmanned vehicle to the calculated position.

For example, the position control unit 340 outputs a control signal for moving the unmanned vehicle to a subarea in which an index value is maximum among subareas adjacent to a subarea in which the unmanned vehicle is located. Further, for example, the position control unit 340 calculates sum of index values by setting a plurality of arrangement patterns of the plurality of unmanned vehicles. The position control unit 340 outputs, to each of the unmanned vehicles, a control signal for moving each of the unmanned vehicles to a position in an arrangement pattern in which the sum of the index values is minimum.

The control device according to the present example embodiment performs updating, based on detection information about each unmanned vehicle and a lapse of time, and performs arrangement control of each unmanned vehicle, based on updated area information. Thus, according to the present example embodiment, an efficient and continuous search operation by a plurality of unmanned vehicles can be achieved while accommodating environmental fluctuations in a target area.

(Control System)

Herein, a hardware configuration that achieves a control system of an unmanned vehicles control system according to the present example embodiment is described by taking a computer 90 in FIG. 11 as one example. Note that, the computer 90 in FIG. 11 is a configuration example for achieving the control system of the unmanned vehicles control system in each of the example embodiments, and does not limit the scope of the present invention.

As in FIG. 11, the computer 90 includes a processor 91, a main storage device 92, an auxiliary storage device 93, an input-output interface 95, and a communication interface 96. In FIG. 11, the interface is indicated by being abbreviated as I/F (Interface). The processor 91, the main storage device 92, the auxiliary storage device 93, the input-output interface 95, and the communication interface 96 are connected to one another via a bus 99 in such a way as to be able to give and receive data. Further, the processor 91, the main storage device 92, the auxiliary storage device 93, and the input-output interface 95 are connected to a network such as the Internet and an intranet via the communication interface 96.

The processor 91 deploys a program stored in the auxiliary storage device 93 and the like in the main storage device 92, and executes the deployed program. In the present example embodiment, the processor 91 may be configured in such a way as to use a software program installed in the computer 90. The processor 91 executes arithmetic processing and control processing being executed by the control system according to the present example embodiment.

The main storage device 92 has a region in which a program is deployed. The main storage device 92 may be a volatile memory such as a dynamic random access memory (DRAM), for example. Further, a non-volatile memory such as a magnetoresistive random access memory (MRAM) may be formed and added as the main storage device 92.

The auxiliary storage device 93 is a means for storing data. The auxiliary storage device 93 is formed of a local disc such as a hard disc or a flash memory. Note that the main storage device 92 may be configured in such a way as to store data, and the auxiliary storage device 93 may be omitted.

The input-output interface 95 is a device that connects the computer 90 and a peripheral apparatus, based on a connection standard of the computer 90 and the peripheral apparatus. The communication interface 96 is an interface for connection with a network such as the Internet and an intranet, based on a standard and a specification. The input-output interface 95 and the communication interface 96 may be standardized as an interface for connection with an external apparatus. For example, when the control device is installed in an unmanned vehicle, at least any of the input-output interface 95 and the communication interface 96 is connected to a sensor and a control apparatus.

The computer 90 may be configured in such a way as to allow connection with an input apparatus, such as a keyboard, a mouse, and a touch panel, as necessary. The input apparatus is used in order to input information and a setting. Note that when a touch panel is used as an input apparatus, a display screen of a display apparatus may be configured in such a way as to function as an interface of the input apparatus. Giving and receiving of data between the processor 91 and the input apparatus may be mediated by the input-output interface 95.

Further, the computer 90 may be equipped with a display apparatus for displaying information. When the computer 90 is equipped with the display apparatus, the computer 90 is preferably provided with a display control device (not illustrated) for controlling display of the display apparatus. The display apparatus may be connected to the computer 90 via the input-output interface 95. For example, when area information of a control device is displayed on the display apparatus, a current search situation of an unmanned vehicle can be visually provided.

Further, the computer 90 may be equipped with a reader/writer as necessary. The reader/writer is connected to the bus 99. The reader/writer mediates between the processor 91 and a recording medium (also referred to as a program recording medium), which is not illustrated, in reading of data and a program from the recording medium, writing of a processing result of the computer 90 to the recording medium, and the like. The recording medium may be achieved by a semiconductor recording medium such as a secure digital (SD) card and a universal serial bus (USB) memory, for example. Further, the recording medium may be achieved by a magnetic recording medium such as a flexible disc, an optical recording medium such as a compact disc (CD) and a digital versatile disc (DVD), and another recording medium.

Although the present invention has been described above with reference to the example embodiments, the present invention is not limited to the above-described example embodiments. Various modifications that can be understood by those skilled in the art within the scope of the present invention can be made to the configuration and the details of the present invention.

REFERENCE SIGNS LIST 1, 2 Unmanned vehicles control system
10 Unmanned vehicle
11 Communicator
12 Sensor
13 Control apparatus
20 Communication network
30 Control device
31 Another-vehicle search information calculation unit
32 Own-vehicle search information calculation unit
33 Area information update unit
34 Area information holding unit
35 Position control unit
50 Management device
51 Area information holding unit
52 Area information update unit
53 Unmanned vehicle search information calculation unit
54 Arrangement control unit
55 Communicator

What is claimed is:
1. A control device, comprising:
at least one memory storing instructions; and
at least one processor connected to the at least one memory and configured to execute the instructions to:
acquire information related to a plurality of unmanned vehicles moving within a target area according to a set operation, the acquired information including, for each unmanned vehicle, detection information regarding a detection range of a sensor mounted on the unmanned vehicle, the detection range acquired from the sensor;
for each unmanned vehicle, calculate search information about the unmanned vehicle by using the acquired information related to the unmanned vehicle, the search information including at least one piece of positional information of the unmanned vehicle, detection range information about the detection range of the unmanned vehicle, and search time information about a time for performing search;
save area information including an inside index for searching in the target area within the detection range and an outside index for searching in the target area outside the detection range;
for each unmanned vehicle, update the area information, based on an elapsed time since the search was performed by the unmanned vehicle and the search information, in such a way that one of the inside index and the outside index is to be increased and another of the inside index and the outside index is to be decreased;

for each unmanned vehicle, calculate a position where an evaluation value is maximum as a position of a movement destination of the unmanned vehicle, based on the area information, the evaluation value equal to sum of values acquired by multiplying, for each subarea of a plurality of subareas, a degree of importance of the subarea within a responsible range of the unmanned vehicle by a distance between the subarea and the unmanned vehicle; and control arrangement of the plurality of unmanned vehicles by outputting, to each unmanned vehicle, a control signal for moving the unmanned vehicle to the calculated position.

2. The control device according to claim 1, wherein the at least one processor is configured to execute the instructions to:

save the area information including an inside index value acquired by converting the inside index into a numerical form and including an outside index value acquired by converting the outside index into the numerical form; and for each unmanned vehicle, when updating the area information, reduce the inside index value and increase the outside index value, based on the search information.

3. The control device according to claim 2, wherein the at least one processor is configured to execute the instruction to for each unmanned vehicle, save, as the area information, information in which the inside index value is assigned to the subarea formed by dividing the target area.

4. The control device according to claim 3, wherein the at least one processor is configured to execute the instructions to control arrangement of the plurality of unmanned vehicles by outputting, to each unmanned vehicle, the control signal for moving the unmanned vehicle to the calculated position by:

outputting the control signal for moving the unmanned vehicle to the subarea in which the inside index value is maximum among the subareas adjacent to the subarea in which the unmanned vehicle is located.

5. The control device according to claim 3, wherein the inside index value is one of a plurality of inside index values, wherein the at least one processor is configured to execute the instructions to:

set a plurality of arrangement patterns of the plurality of the unmanned vehicles, the inside index values corresponding to the arrangement patterns;

assign each inside index value to the subarea within the target area for the arrangement pattern to which the inside index value corresponds;

calculate a sum of the inside index values, wherein the at least one processor is configured to execute the instructions to control arrangement of the plurality of unmanned vehicles by outputting, to each unmanned vehicle, the control signal for moving the unmanned vehicle to the calculated position by:

outputting, to each unmanned vehicle, the control signal for moving the unmanned vehicle to the calculated position in the arrangement pattern based on the sum of the inside index values.

6. An unmanned vehicle, comprising:

the control device according to claim 1;

a communicator configured to communicate with other of the unmanned vehicles via a communication network;

a sensor configured to acquire the detection information about a the detection range of the unmanned vehicle;

a control apparatus configured to control a power system of the unmanned vehicle, based on area information which includes an index for searching in a target area and is updated by the control device;

at least one memory storing instructions; and at least one processor connected to the at least one memory and configured to execute the instructions to calculate the search information related to the unmanned vehicle itself by using the detection information acquired by the sensor.

7. A management device, comprising:

the control device according to claim 1; and a communicator configured to communicate with the unmanned vehicle via a communication network.

8. An unmanned vehicles control system, comprising:

the management device according to claim 7; and a plurality of the unmanned vehicles, wherein the unmanned vehicle includes a communicator which is configured to communicate with another of the unmanned vehicles via a communication network, a sensor which is configured to acquire detection information about a detection range of the unmanned vehicle, and a control apparatus which is configured to control a power system of the unmanned vehicle, based on area information.

9. A control method, comprising:

acquiring information related to a plurality of unmanned vehicles moving within a target area according to a set operation, the acquired information including, for each unmanned vehicle, detection information regarding a detection range of a sensor mounted on the unmanned vehicle, the detection range acquired from the sensor;

for each unmanned vehicle, calculating search information about the unmanned vehicle by using the acquired information related to the unmanned vehicle, the search information including at least one piece of positional information of the unmanned vehicle, detection range information about the detection range of the unmanned vehicle, and search time information about a time for performing search;

saving area information including an inside index for searching in the target area within the detection range and an outside index for searching in the target area outside the detection range;

for each unmanned vehicle, updating the area information, based on an elapsed time since the search was performed by the unmanned vehicle and the search information, in such a way that one of the inside index and the outside index is to be increased and another of the inside index and the outside index is to be decreased;

for each unmanned vehicle, calculating a position where an evaluation value is maximum as a position of a movement destination of the unmanned vehicle, based on the area information, the evaluation value equal to sum of values acquired by multiplying, for each subarea of a plurality of subareas, a degree of importance of the subarea within a responsible range of the unmanned vehicle by a distance between the subarea and the unmanned vehicle; and controlling arrangement of the plurality of unmanned vehicles by outputting, to each unmanned vehicle, a control signal for moving the unmanned vehicle to the calculated position.

10. A non-transitory program recording medium that records a program causing a computer to execute:

processing of acquiring information related to a plurality of unmanned vehicles moving within a target area according to a set operation, the acquired information including, for each unmanned vehicle, detection information regarding a detection range of a sensor mounted on the unmanned vehicle, the detection range acquired from the sensor;

processing of, for each unmanned vehicle, calculating search information about the unmanned vehicle by using the acquired information related to the unmanned vehicle, the search information including at least one piece of positional information of the unmanned vehicle, detection range information about the detection range of the unmanned vehicle, and search time information about a time for performing search;

processing of saving area information including an inside index for searching in the target area within the detection range and an outside index for searching in the target area outside the detection range;

processing of, for each unmanned vehicle, updating the area information, based on an elapsed time since the search was performed by the unmanned vehicle and the search information, in such a way that one of the inside index and the outside index is to be increased and another of the inside index and the outside index is to be decreased;

processing of, for each unmanned vehicle, calculating a position where an evaluation value is maximum as a position of a movement destination of the unmanned vehicle, based on the area information, the evaluation value equal to sum of values acquired by multiplying, for each subarea of a plurality of subareas, a degree of importance of the subarea within a responsible range of the unmanned vehicle by a distance between the subarea and the unmanned vehicle; and processing of controlling arrangement of the plurality of unmanned vehicles by outputting, to each unmanned vehicle, a control signal for moving the unmanned vehicle to the calculated position.

* * * * *